US009394820B2

(12) United States Patent
Osumi

(10) Patent No.: US 9,394,820 B2
(45) Date of Patent: Jul. 19, 2016

(54) EXHAUST GAS PURIFICATION SYSTEM AND METHOD FOR PURIFYING EXHAUST GAS

(71) Applicant: ISUZU MOTORS LIMITED, Tokyo (JP)

(72) Inventor: Kazuo Osumi, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 14/395,546

(22) PCT Filed: May 7, 2013

(86) PCT No.: PCT/JP2013/062818
§ 371 (c)(1),
(2) Date: Oct. 20, 2014

(87) PCT Pub. No.: WO2013/172215
PCT Pub. Date: Nov. 21, 2013

(65) Prior Publication Data
US 2015/0128566 A1 May 14, 2015

(30) Foreign Application Priority Data
May 18, 2012 (JP) ................. 2012-114474

(51) Int. Cl.
F01N 3/00 (2006.01)
F01N 3/20 (2006.01)
(Continued)

(52) U.S. Cl.
CPC ............ F01N 3/208 (2013.01); B01D 53/9418 (2013.01); B01D 53/9477 (2013.01);
(Continued)

(58) Field of Classification Search
USPC ............ 60/274, 280, 286, 295, 297, 301, 303
See application file for complete search history.

(56) References Cited

U.S. PATENT DOCUMENTS 6,823,660 B2* 11/2004 Minami .................... 60/280
8,209,966 B2* 7/2012 Sakata et al. .............. 60/295
(Continued)

FOREIGN PATENT DOCUMENTS

EP 1795724 6/2007
EP 2116293 11/2009
(Continued)

OTHER PUBLICATIONS

Patent Abstracts of Japan, Publication No. 2006-057578, published Mar. 2, 2006.
(Continued)

Primary Examiner — Binh Q Tran
(74) Attorney, Agent, or Firm — Staas & Halsey LLP

(57) ABSTRACT

A previous-stage oxidation catalyst device, a Diesel Particulate Filter (DPF) device, a turbine of a turbocharger, a previous-stage NOx selective reduction catalyst device, and a subsequent-stage NOx selective reduction catalyst device in an exhaust system of an internal combustion engine in this order from an exhaust port side. An ammonia-based solution feeder is on an inlet side or outlet side of the DPF device. The previous-stage NOx selective reduction catalyst device is a rare earth composite oxide catalyst, and the subsequent-stage NOx selective reduction catalyst device is a zeolite catalyst. The NOx removal rate is improved in wide ranges from low to high temperatures and to high flow rates, and the temperature of the DPF device is kept high to increase the time and frequency of continuous regeneration, thereby reducing the frequency of forced regeneration and an amount of discharge of $CO_2$ during the forced regeneration.

5 Claims, 12 Drawing Sheets

(51) Int. Cl.
*B01D 53/94* (2006.01)
*F01N 3/10* (2006.01)
*F01N 9/00* (2006.01)
*F01N 3/021* (2006.01)
*F02B 37/00* (2006.01)
*F01N 3/025* (2006.01)
*F02D 41/00* (2006.01)
*F02D 41/14* (2006.01)
*F02D 41/02* (2006.01)

(52) U.S. Cl.
CPC ............ *B01D53/9495* (2013.01); *F01N 3/021* (2013.01); *F01N 3/0253* (2013.01); *F01N 3/103* (2013.01); *F01N 3/2066* (2013.01); *F01N 9/002* (2013.01); *F02B 37/00* (2013.01); *F02D 41/0055* (2013.01); *F02D 41/029* (2013.01); *F02D 41/146* (2013.01); *B01D 53/944* (2013.01); *B01D 2255/206* (2013.01); *B01D 2255/207* (2013.01); *B01D 2255/40* (2013.01); *B01D 2255/407* (2013.01); *B01D 2255/50* (2013.01); *B01D 2255/904* (2013.01); *F01N 2250/02* (2013.01); *F01N 2340/06* (2013.01); *F01N 2570/14* (2013.01); *F01N 2570/18* (2013.01); *F01N 2610/02* (2013.01); *F02D 41/0275* (2013.01); *F02D 2200/0802* (2013.01); *F02D 2200/0812* (2013.01); *Y02T 10/144* (2013.01); *Y02T 10/24* (2013.01); *Y02T 10/47* (2013.01)

(56) References Cited

U.S. PATENT DOCUMENTS

| 8,297,046 B2 * | 10/2012 | Bandl-Konrad et al. ....... 60/297 |
| 8,505,278 B2 * | 8/2013 | Farrell et al. .................... 60/285 |
| 8,544,260 B2 * | 10/2013 | Boorse ................... F01N 3/035 60/273 |
| 8,656,702 B2 * | 2/2014 | Alm ...................... F01N 13/009 60/285 |
| 8,701,388 B2 * | 4/2014 | Gonze .................... F01N 3/027 60/284 |
| 8,875,490 B2 * | 11/2014 | Geveci et al. ................... 60/286 |
| 2011/0146237 A1 | 6/2011 | Adelmann et al. |
| 2011/0146268 A1 | 6/2011 | Hepburn et al. |

FOREIGN PATENT DOCUMENTS

| JP | 8-206501 | 8/1996 |
| JP | 2003-184542 | 7/2003 |
| JP | 2006-57578 | 3/2006 |
| JP | 2008-513656 | 5/2008 |
| JP | 2010-90796 | 4/2010 |
| JP | 2010-142688 | 7/2010 |
| JP | 2010-242515 | 10/2010 |
| JP | 2011-94495 | 5/2011 |
| JP | 2011-111945 | 6/2011 |
| JP | 2011-132949 | 7/2011 |
| JP | 2011-149400 | 8/2011 |

OTHER PUBLICATIONS

Patent Abstracts of Japan, Publication No. 2010-090796, published Apr. 22, 2010.
Patent Abstracts of Japan, Publication No. 2010-142688, published Jul. 1, 2010.
Patent Abstracts of Japan, Publication No. 2010-242515, published Oct. 28, 2010.
Patent Abstracts of Japan, Publication No. 2011-094495, published May 12, 2011.
Patent Abstracts of Japan, Publication No. 2011-111945, published Jun. 9, 2011.
Patent Abstracts of Japan, Publication No. 2011-132949, published Jul. 7, 2011.
Patent Abstracts of Japan, Publication No. 2011-149400, published Aug. 4, 2011.
International Search Report mailed Jun. 18, 2013, in corresponding International Patent Application No. PCT/JP2013/062818.

* cited by examiner

EXHAUST GAS PURIFICATION SYSTEM AND METHOD FOR PURIFYING EXHAUST GAS

CROSS-REFERENCE TO RELATED APPLICATIONS

This application is a U.S. National Stage Application, which claims the benefit under 35 U.S.C. §371 of PCT International Patent Application No. PCT/JP2013/062818, filed May 7, 2013, which claims the foreign priority benefit under 35 U.S.C. §119 of Japanese Patent Application No. 2012-114474, filed May 18, 2012, the contents of which are incorporated herein by reference.

TECHNICAL FIELD

The present invention relates to an exhaust gas purification system and an exhaust gas purification method for removing PMs (particulate matters), NOx (nitrogen oxides), and the like in the exhaust gas of the internal combustion engine mounted on a diesel automobile or the like.

BACKGROUND ART

In view of preservation of the global environment, automobile emission control has increasingly been advanced. In particular, diesel engines designed to be mounted on vehicles have been required to decrease particulate matters (PMs) and nitrogen oxides (NOx). Diesel particulate filter devices (DPF devices) have been used to decrease the PMs, and urea NOx selective reduction catalyst devices (urea SCR devices), hydrocarbon NOx selective reduction catalyst devices (HC-SCR devices), lean NOx trap catalyst device (LNT devices), and the like are used to decrease the nitrogen oxides. Removal of hazardous substances by mounting these multiple types of exhaust gas purification devices has been advanced.

As one such example, an exhaust gas purification system as described in Japanese patent application Kokai publication No. 2010-242515 has been proposed. In the system, an oxidation catalyst, a urea injection device, a diesel particulate filter device, a NOx selective reduction catalyst converter, and an oxidation catalyst are disposed in an exhaust passage in this order from an upstream side. Also, a urea decomposition catalyst is supported in the diesel particulate filter device, instead of supporting a catalyst with an oxidizing function.

Moreover, there has also been an exhaust gas purification system 1X as illustrated in FIG. 17 including an exhaust gas purification apparatus 20X in which an oxidation catalyst device 21, a diesel particulate filter device (DPF) 22, and a NOx selective reduction catalyst device (SCR) 23X are disposed in this order from an upstream side at a position downstream of a turbine 14 of a turbocharger provided in an exhaust passage 13 of an internal combustion engine 10, and a urea injection nozzle 25 is provided between the diesel particulate filter device 22 and the NOx selective reduction catalyst device 23X.

With the improvement in engine combustion, fuel consumption has been improved and the total amount of discharge of particulate matters and nitrogen oxides has been decreased as well. On the other hand, the temperature of exhaust gas that flows into the exhaust gas purification apparatus has been decreased. Specifically, as a result of the improvement in engine's combustion conditions, the temperature of exhaust gas has been decreased by 30° C. to 50° C. or greater as compared to conventional cases. In addition, exhaust gas purification apparatuses have been employing multiple devices therein and therefore increased in size, thus increasing the thermal capacity. For these reasons, it has become difficult to ensure the activation temperatures of the catalysts.

In addition, in a urea SCR system, it is difficult to shorten the distance from a urea feeder such as a urea water injection nozzle to a urea NOx selective reduction catalyst device in view of evenly dispersing urea water and accelerating decomposition of the urea to ammonia. This has also been a major cause of the increase in the size of exhaust gas purification apparatuses.

As a countermeasure to these problems, the inventor of the present application has proposed a diesel engine exhaust gas purification apparatus as described in Japanese patent application Kokai publication No. 2011-149400, for example. In the apparatus, previous-stage oxidation catalysts (DOCs), a urea injection nozzle, a turbine of a turbocharger (low-pressure stage turbine), a diesel particulate filter (DPF), a selective reduction catalyst (urea SCR), and a subsequent-stage oxidation catalyst (R-DOC) are disposed in an exhaust passage in this order from an upstream side. With this configuration, each post-treatment unit is made closer to exhaust ports, so that the heat of the exhaust gas is effectively utilized for the each post-treatment unit easily to ensure its catalyst activation temperature.

Meanwhile, the modes for measuring exhaust gas will switch from the conventionally used JE05 driving mode (Japanese driving mode simulating inner-city driving), the NEDC (European driving cycle) driving mode, and the like to a world harmonized standard, or WHDC (vehicle cycle for testing exhaust gas emission of heavy vehicles) driving mode, and the like. For this reason, decreasing exhaust gas during a cold mode and under high-temperature, high-flow-rate conditions will be necessary.

On the other hand, as for urea SCR systems, controlling adsorption of urea, its intermediate, and ammonia ($NH_3$) has been considered for improving the nitrogen oxide (NOx) removal rate at low temperatures. However, there is a problem in that controlling adsorption of these is difficult in high-temperature, high-flow-rate ranges. Moreover, as for DPF systems, the decrease in the temperature of exhaust gas passing through a DPF device decreases the range where continuous regeneration is possible. This increases the frequency of exhaust heating control performed to forcibly combust particulate matters (PMs) captured by the DPF device. Thus, a problem arises in that the amount of carbon dioxide ($CO_2$) discharged during forced regeneration of the DPF device increases.

PRIOR ART DOCUMENTS

Patent Document 1: Japanese patent application Kokai publication No. 2010-242515
Patent Document 2: Japanese patent application Kokai publication No. 2011-149400

SUMMARY OF THE INVENTION

The present invention has been made in view of the above-mentioned circumstances, and an object thereof is to provide an exhaust gas purification system and an exhaust gas purification method capable of improving the NOx removal rate in wide ranges from low to high temperatures and to high flow rates, and also keeping the temperature of a DPF device high to increase the time and frequency of continuous regeneration, thus decreasing the frequency of forced regeneration of the DPF device and the amount of discharge of carbon dioxide ($CO_2$) produced during the forced regeneration, by using a configuration that improves the ammonia ($NH_3$) production rate and a two-stage configuration that includes a previous-stage NOx selective reduction catalyst device for high temperatures and a subsequent-stage NOx selective reduction catalyst device for low temperatures.

An exhaust gas purification system of the present invention for achieving the above-mentioned object is an exhaust gas purification system for removing particulate matters and nitrogen oxides in an exhaust gas of an internal combustion engine, in which a previous-stage oxidation catalyst device, a diesel particulate filter device, a turbine of a turbocharger, a previous-stage NOx selective reduction catalyst device, and a subsequent-stage NOx selective reduction catalyst device are disposed in an exhaust system of the internal combustion engine in this order from an exhaust port side, an ammonia-based solution feeder is disposed between the previous-stage oxidation catalyst device and the diesel particulate filter device or between the diesel particulate filter device and the turbine, and a NOx selective reduction catalyst (SCR catalyst) of the previous-stage NOx selective reduction catalyst device is made of a catalyst containing a rare earth composite oxide (such as a Ce—Zr—O-based composite oxide), and a NOx selective reduction catalyst (SCR catalyst) of the subsequent-stage NOx selective reduction catalyst device is made of a zeolite catalyst.

According to this configuration, the ammonia-based solution feeder such as a urea injection nozzle for feeding an ammonia-based solution containing urea or the like is disposed upstream of the turbine. Thus, the position of the ammonia-based solution feeder can be close to the internal combustion engine, and the temperature of the exhaust gas to be fed with the ammonia-based solution can be kept high as compared to the arrangements of conventional techniques. Accordingly, the rate of production of $NH_3$ (ammonia) from the ammonia-based solution can be improved.

Moreover, there are disposed the previous-stage NOx selective reduction catalyst device for high temperatures made of a catalyst containing a rare earth composite oxide such as a Ce—Zr—O-based composite oxide, and the subsequent-stage NOx selective reduction catalyst device for low temperatures made of a zeolite catalyst. With this two-stage configuration, it is possible to improve the NOx removal rate in wide ranges from low to high temperatures and to high flow rates.

Moreover, since the diesel particulate filter device (DPF device) is disposed upstream of the turbine, the position of the DPF device is close to the exhaust port. In this way, the temperature of the exhaust gas at the inlet of the DPF device can be kept higher by 100° C. or greater than those of the arrangements of the conventional techniques. This makes it possible to increase the time and frequency of continuous regeneration of the DPF device. As a result, the size of the DPF device can be decreased and the heating time during regeneration can be shortened, thereby making it possible to decrease the amount of discharge of $CO_2$ during the regeneration of the DPF device. In addition to this, the degree of freedom in layout can be increased.

Further, in the case of employing the configuration in which the ammonia-based solution feeder is disposed between the previous-stage oxidation catalyst device and the DPF device, the ammonia-based solution feeder is disposed upstream of the DPF device and can therefore be closer to the internal combustion engine. In this way, the temperature of the exhaust gas to be fed with the ammonia-based solution can be kept higher by 100° C. or greater than those of the arrangements of the conventional techniques. Accordingly, the $NH_3$ production rate can further be improved.

Moreover, in the case of employing the configuration in which the ammonia-based solution feeder is disposed between the previous-stage oxidation catalyst device and the diesel particulate filter device, the ammonia-based solution feeder, the DPF device, and the turbine are disposed in this order. In this way, SOx (sulfur oxides) produced by combustion inside the cylinder is changed to $CaSO_4$ (calcium sulfate), which has low corrosive properties, through a chemical reaction with $NH_3$ (ammonia) produced from the ammonia-based solution containing urea or the like fed from the ammonia-based solution feeder such as a urea injection nozzle, and with an ash component produced after the combustion of PMs in the DPF device. Thus, it is possible to suppress corrosion of the turbine by SOx produced by high-pressure EGR combustion. Further, since the DPF device is disposed in such a way as not to be influenced by ash originating from the oil of the turbine, it is possible to avoid the influence of the ash on clogging of the DPF device.

In addition, an EGR passage can be provided upstream of the turbine but immediately downstream of the oxidation catalyst device or immediately downstream of the DPF device to take out an EGR gas. Thus, the EGR passage can be shortened. Further, since the EGR gas is the exhaust gas from which HC and PMs have been removed, the above configuration is effective as a countermeasure to prevent contamination in the EGR passage.

The above-described exhaust gas purification system may include an ammonia-based solution feed controller for finding, from an equivalence ratio of a chemical reaction, an amount which enables reduction of an amount of NOx discharged from the internal combustion engine, calculating a first ammonia-based solution amount larger than the amount enabling the reduction, calculating a second ammonia-based solution amount from a difference between a NOx target discharge amount from the internal combustion engine, and an amount of NOx measured downstream of the subsequent-stage NOx selective reduction catalyst device, setting an amount of an ammonia-based solution to be fed to the exhaust system based on the sum of the first ammonia-based solution amount and the second ammonia-based solution amount, and feeding the ammonia-based solution from the ammonia-based solution feeder. With this configuration, the amount of feed of the ammonia-based solution can be a more appropriate amount. Thus, NOx can be removed efficiently.

Specifically, in the case of the arrangements of the conventional techniques, urea is injected upstream of the NOx selective reduction catalyst (SCR catalyst), and urea, an intermediate of urea, $NH_3$, and the like (urea-derived substances) and NOx are adsorbed to the catalyst surface of the NOx selective reduction catalyst device (SCR device). The amount of injection of urea is controlled based on the amount of the engine-out NOx (a $NH_3$/NO equivalence ratio of 1 or greater). Such control works effectively when the temperature at the inlet of the NOx selective reduction catalyst device is low (300° C. or lower). However, the urea-derived substances and NOx after the adsorption desorb as soon as the temperature becomes high (above 300° C.) Thus, there is a problem in that a high NOx removal rate cannot be achieved with adsorption control performed similarly to when the temperature is low.

On the other hand, in the present invention, the previous-stage NOx selective reduction catalyst device is used for NOx removal on a high-temperature side, and the subsequent-stage NOx selective reduction catalyst device is used for NOx removal on a low-temperature side. For the NOx removal by the NOx selective reduction catalyst devices at two stages, the first ammonia-based solution amount is calculated for the upstream, previous-stage NOx selective reduction catalyst device, the first ammonia-based solution amount being within a range in which the amount of urea relative to the amount of the engine-out NOx is equal to an $NH_3/NO$ equivalence ratio of 1.0 to 1.3. Also, the second ammonia-based solution amount, which is equal to the amount of shortage of the ammonia-based solution, is calculated for the downstream, subsequent-stage NOx selective reduction catalyst device from the amount of discharge of NOx downstream of the subsequent-stage NOx selective reduction catalyst device and added to the first ammonia-based solution amount, by which the ammonia-based solution is then fed.

The above-described exhaust gas purification system may include a hydrocarbon feed controller for performing control in which a hydrocarbon is fed into the exhaust gas upstream of the previous-stage oxidation catalyst device by post injection via injection inside a cylinder or by exhaust pipe fuel injection in a case where a differential pressure between upstream and downstream sides of the diesel particulate filter device is equal to or higher than a continuous regeneration determination differential pressure but equal to or lower than an automatic forced regeneration determination differential pressure, and a temperature of the exhaust gas at an inlet of the diesel particulate filter device is equal to or lower than a continuous regeneration control start temperature. With this configuration, by the effect of HC adsorption and oxidation of the oxidation catalyst in the previous-stage oxidation catalyst device upstream of the DPF device, when continuous regeneration of the DPF device is needed, the temperature of the exhaust gas that flows into the DPF device (the temperature of the exhaust gas at the inlet) can be raised to a temperature at which continuous regeneration is possible. In this way, the interval of the automatic forced regeneration control for the DPF device can be extended. Accordingly, the amount of discharge of $CO_2$ during the regeneration of the DPF device can further be decreased.

An exhaust gas purification method of the present invention for achieving the above-mentioned object is an exhaust gas purification method for removing particulate matters and nitrogen oxides in an exhaust gas of an internal combustion engine by using an exhaust gas purification system in which a previous-stage oxidation catalyst device, a diesel particulate filter device, a turbine of a turbocharger, a previous-stage NOx selective reduction catalyst device, and a subsequent-stage NOx selective reduction catalyst device are disposed in an exhaust system of the internal combustion engine in this order from an exhaust port side, and an ammonia-based solution feeder is disposed between the previous-stage oxidation catalyst device and the diesel particulate filter device or between the diesel particulate filter device and the turbine, wherein the method includes: finding, from an equivalence ratio of a chemical equation, an amount which enables reduction of an amount of NOx discharged from the internal combustion engine; calculating a first ammonia-based solution amount larger than the amount enabling the reduction; calculating a second ammonia-based solution amount from a difference between a NOx target discharge amount from the internal combustion engine, and an amount of NOx measured downstream of the subsequent-stage NOx selective reduction catalyst device; setting an amount of an ammonia-based solution to be fed to the exhaust system based on the sum of the first ammonia-based solution amount and the second ammonia-based solution amount; and feeding the ammonia-based solution from the ammonia-based solution feeder.

With this method, the amount of feed of the ammonia-based solution can be a more appropriate amount. Thus, NOx can be removed efficiently.

The above-described exhaust gas purification method may further include feeding a hydrocarbon into the exhaust gas upstream of the previous-stage oxidation catalyst device by post injection via injection inside a cylinder or by exhaust pipe fuel injection in a case where a differential pressure between upstream and downstream sides of the diesel particulate filter device is equal to or higher than a continuous regeneration determination differential pressure but equal to or lower than an automatic forced regeneration determination differential pressure, and a temperature of the exhaust gas at an inlet of the diesel particulate filter device is equal to or lower than a continuous regeneration control start temperature. In this way, by the effect of HC adsorption and oxidation of the oxidation catalyst in the previous-stage oxidation catalyst device upstream of the DPF device, when continuous regeneration of the DPF device is needed, the temperature of the exhaust gas that flows into the DPF device (the temperature of the exhaust gas at the inlet) can be raised to a temperature at which continuous regeneration is possible. In this way, the interval of the automatic forced regeneration control for the DPF device can be extended. Accordingly, the amount of discharge of $CO_2$ during the regeneration of the DPF device can further be decreased.

With the exhaust gas purification system and the exhaust gas purification method according to the present invention, the urea injection nozzle can be disposed significantly close to the engine body. Thus, it is possible to improve the ammonia ($NH_3$) production rate and therefore improve the NOx removal rate. In addition to this, with the two-stage configuration including the previous-stage NOx selective reduction catalyst device for high temperatures and the subsequent-stage NOx selective reduction catalyst device for low temperatures, it is possible to improve the NOx removal rate in wide ranges from low to high temperatures and to high flow rates.

Moreover, since the DPF device is disposed upstream of the turbine, the position of the DPF device is close to the exhaust port, and therefore the temperature of the DPF device can be kept high. This makes it possible to increase the time and frequency of continuous regeneration and decrease the size. The decrease in the size of the DPF can shorten the heating time during regeneration. Thus, it is possible to decrease the amount of discharge of $CO_2$ during regeneration of the DPF device and also to increase the degree of freedom in layout.

Further, since the DPF device is disposed upstream of the turbine and is not influenced by ash originating from the oil of the turbine, it is possible to avoid the influence of the ash on clogging of the DPF device.

In addition, in the case where the ammonia-based solution feeder is disposed between the previous-stage oxidation catalyst device and the DPF device, the ammonia-based solution feeder, the DPF device, and the turbine are disposed in this order. In this way, sulfur oxides (SOx) produced by combustion in the cylinder can be changed to calcium sulfate ($CASO_4$), which has low corrosive properties, through a reaction with calcium carbonate ($CaCO_3$) produced by the combustion of particulate matters (PMs) captured by the DPF device. Thus, it is possible to suppress corrosion of the turbine of the turbocharger disposed downstream of the DPF device by the sulfur components.

DETAILED DESCRIPTION

Hereinbelow, exhaust gas purification systems and exhaust gas purification methods of embodiments according to the present invention will be described with reference to the drawings. Here, an example will be given in which a NOx selective reduction catalyst is a urea NOx selective reduction catalyst, and an ammonia-based solution is urea. However, the present invention is not limited to this example and may employ an HC-NOx selective reduction catalyst or the like.

Figure 1:
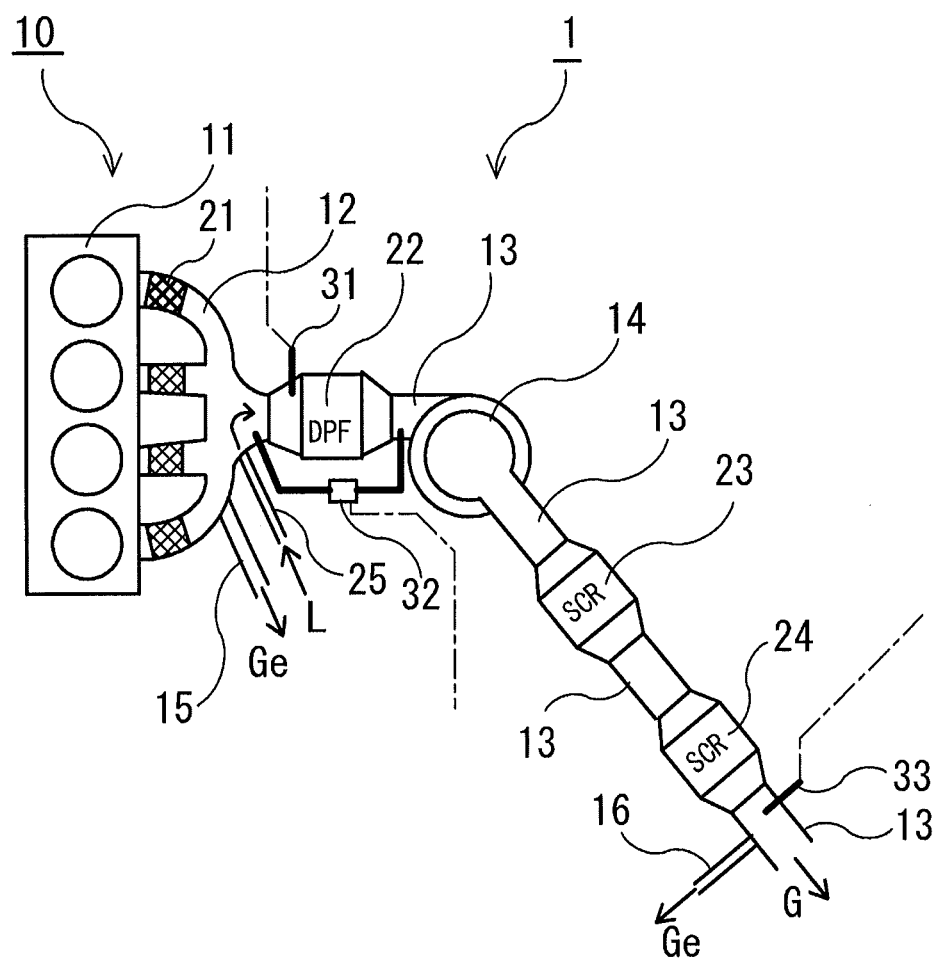
FIG. 1 is a view of an exhaust gas purification system of an embodiment of the present invention, illustrating a configuration in which previous-stage oxidation catalyst devices are provided at a single stage.

As illustrated in FIG. 1, an exhaust gas purification system 1 of an embodiment according to the present invention is an exhaust gas purification system for removing PMs (particulate matters) and NOx (nitrogen oxides) in an exhaust gas G of an internal combustion engine (hereinafter referred to as the engine) 10 such as a diesel engine. The exhaust gas purification system 1 is configured such that a previous-stage oxidation catalyst device (DOC) 21, a diesel particulate filter device (hereinafter referred to as the DPF device) 22, a turbine 14 of a turbocharger, a previous-stage NOx selective reduction catalyst device (hereinafter referred as the previous-stage SCR device) 23, and a subsequent-stage NOx selective reduction catalyst device (hereinafter referred to as the subsequent-stage SCR device) 24 are disposed in the exhaust system of the engine 10 in this order from an exhaust port side connected to an engine body 11.

Moreover, a urea injection nozzle 25 as an ammonia-based solution feeder is disposed between the previous-stage oxidation catalyst device (DOC) 21 and the DPF device 22 as illustrated in FIG. 1. The urea injection nozzle 25 may be disposed between the DPF device 22 and the turbine 14 as illustrated in FIG. 2.

Figure 2:
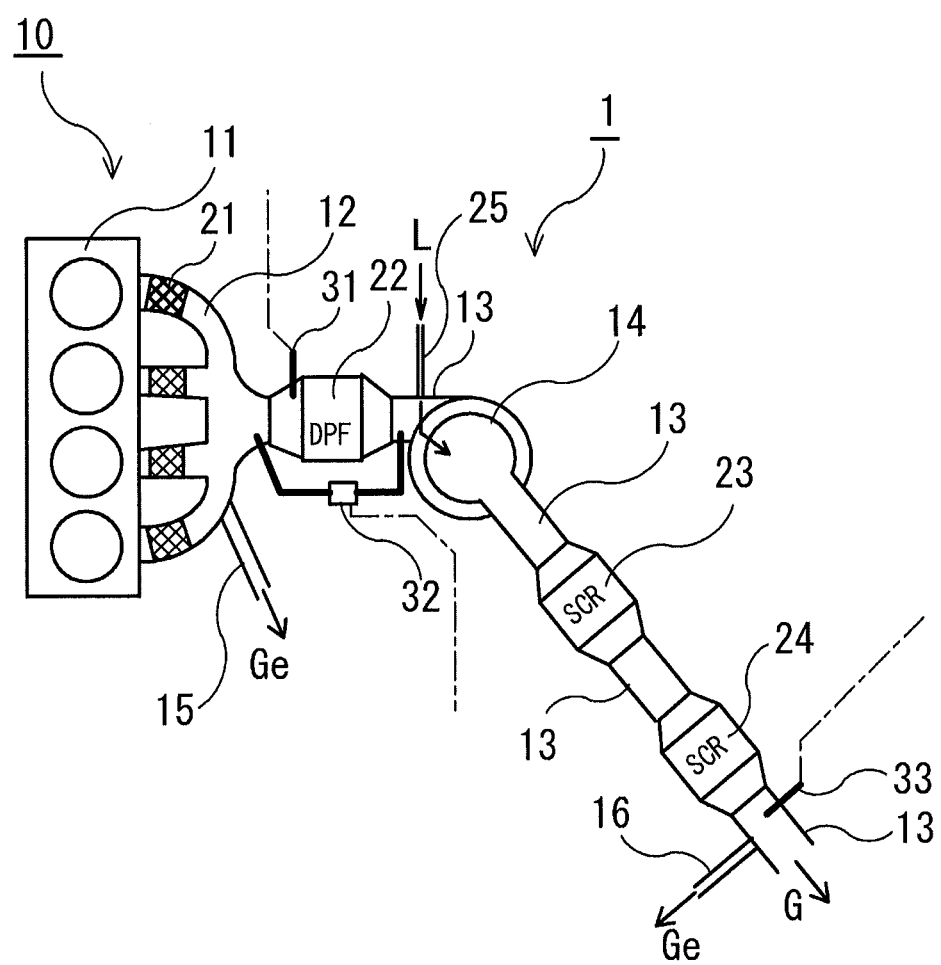
FIG. 2 is a view of the exhaust gas purification system in FIG. 1, illustrating a configuration in which the position of a urea injection nozzle is different.

As illustrated in FIGS. 1 and 2, the previous-stage oxidation catalyst device 21 is disposed for each exhaust port in an exhaust manifold 12 so that each previous-stage oxidation catalyst device 21 can contact the exhaust gas G as long as possible and thereby increase the time for which the supported oxidation catalyst is at or above its activation temperature. Moreover, if necessary, a subsequent-stage oxidation catalyst device (R-DOC: not illustrated) is disposed downstream of the subsequent-stage SCR device 24 for $NH_3$ (ammonia) slip, so as to decompose $NH_3$ flowing out of the subsequent-stage SCR device 24.

Each previous-stage oxidation catalyst device 21 is formed by disposing catalyst layers containing a metal catalyst which is excellent in removal of CO (carbon monoxide) and a catalyst in which an oxide with an oxygen storage capacity (OSC) and an oxide semiconductor exist in a mixed state. As the oxide with an oxygen storage capacity, an oxide containing Ce (cerium) is available. As the oxide semiconductor, $TiO_2$ (titanium dioxide), ZnO (zinc oxide), $Y_2O_3$ (yttrium oxide), and the like are available. Moreover, a precious metal is supported on the oxide with an oxygen storage capacity.

Figure 3:
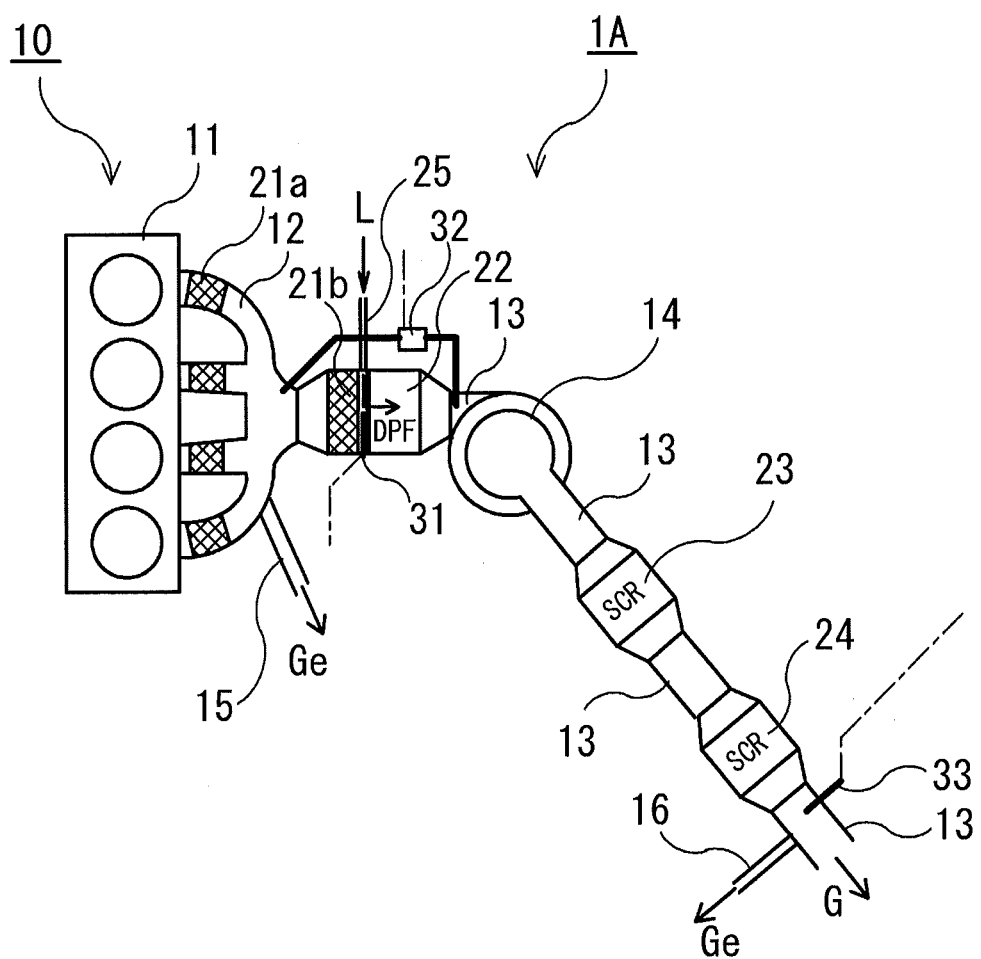
FIG. 3 is a view of an exhaust gas purification system of an embodiment of the present invention, illustrating a configuration in which previous-stage oxidation catalyst devices are provided at two stages.
Figure 4:
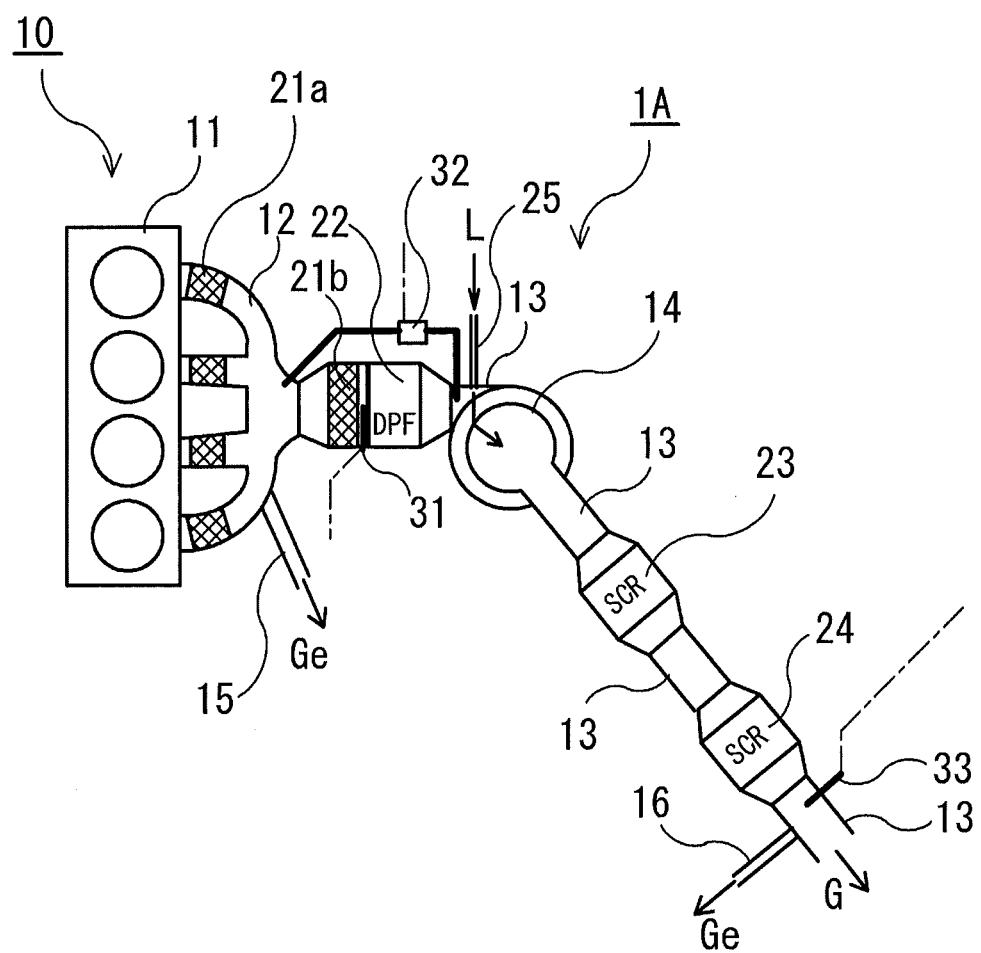
FIG. 4 is a view of the exhaust gas purification system in FIG. 3, illustrating a configuration in which the position of a urea injection nozzle is different.

Meanwhile, depending on the exhaust temperature, HC (hydrocarbon) concentration, and CO concentration, the exhaust gas purification system 1 may employ a configuration in which the previous-stage oxidation catalyst devices 21 are provided at a single stage as illustrated in FIGS. 1 and 2. However, in a case where the HC concentration and CO concentration in the exhaust gas are high, the previous-stage oxidation catalyst devices 21 are preferably divided and disposed as a first oxidation catalyst device (DOC-1) 21a and a second oxidation catalyst device (DOC-2) 21b so that a catalyst configuration excellent in low-temperature activation can be obtained. In this case, like an exhaust gas purification systems 1A illustrated in FIGS. 3 and 4, the first oxidation catalyst device 21a is disposed for each cylinder and exhaust port in the exhaust manifold 12, while the second oxidation catalyst device 21b is disposed downstream of the outlet of the exhaust manifold 12. Note that the configurations in FIGS. 3 and 4 are the same, except that the urea injection nozzle 25 as the ammonia-based solution feeder is disposed between the previous-stage oxidation catalyst devices (DOC) 21 and the DPF device 22 in FIG. 3, whereas the urea injection nozzle 25 is disposed between the DPF device 22 and the turbine 14 in FIG. 4.

In each first oxidation catalyst device 21a, catalyst layers are disposed which contain a metal catalyst which is excellent in CO removal, a catalyst in which an oxide with an OSC such as an oxide containing cerium (Ce), and an oxide semiconductor such as $TiO_2$, ZnO, or $Y_2O_3$ exist in a mixed state. Moreover, a precious metal is supported on the oxide with an OSC. On the other hand, in the second oxidation catalyst device 21b, catalyst layers are disposed which contain a catalyst of a precious metal such as platinum (Pt) excellent in HC removal, or a catalyst in which a HC adsorbing material and a precious metal catalyst exist in a mixed state. With these, a catalyst configuration excellent in low-temperature activation can be obtained.

For the DPF device 22, it is preferable to use a small DPF decreased in volume by 50% or more as compared to those by conventional techniques, by forming a structure with optimized porosity, pore diameter, and wall thickness that allow equivalent purification characteristics and also a smaller pressure loss. Further, in a case where urea L is to be sprayed upstream of the DPF device 22 (in the case of the configurations in FIGS. 1 and 3), the DPF device 22 is coated with no precious metal catalyst so as to prevent oxidation of the urea L. In this case, a DPF coated with no catalyst, or a DPF coated with a highly basic rare earth oxide- or alkaline earth oxide-based catalyst is used. Moreover, by coating the DPF with a hydrolysis catalyst, the $NH_3$ production rate can further be improved, and the NOx removal rate can therefore be improved.

In the previous-stage SCR device 23, a catalyst with high NOx removal performance at high temperatures is preferably supported, such as a NOx selective reduction catalyst (hereinafter referred to as the SCR catalyst) made of a catalyst containing a rare earth composite oxide (such as a Ce—Zr—O-based composite oxide). On the other hand, in the subsequent-stage SCR device 24, a zeolite catalyst having a function of adsorbing urea-derived substances and NOx at low temperatures is preferably supported. It is also preferable to use a small SCR device using a characteristic catalyst support (monolithic catalyst) or the like to increase the amount of the catalyst per specific volume so that a 50% or more decrease in size can be achieved as compared to conventional cases.

Since the urea injection nozzle 25 is disposed upstream of the turbine 14, the urea L is injected upstream of the turbine 14. Thus, the urea L injected into the exhaust gas G is agitated and dispersed inside the turbine 14. Accordingly, the hydrolysis and pyrolysis of the urea L are accelerated. Further, the dispersion of the spray in an exhaust passage 13 after passing through the turbine 14 becomes uniform. Thus, the distance from the urea injection nozzle 25 to the previous-stage SCR device 23 can be shortened, and closer arrangement can therefore be obtained.

Moreover, an HP-EGR passage 15 and a LP-EGR passage 16 for performing EGR to decrease NOx are provided. The HP-EGR passage 15 separates an EGR gas Ge to be recirculated for HP (high pressure)-EGR after it passes the previous-stage oxidation catalyst devices 21 (or the first oxidation catalyst devices 21a in FIG. 3 or 4) at the exhaust passage 13 upstream of the urea injection nozzle 25. In this way, the EGR gas Ge after passing through the previous-stage oxidation catalyst devices 21 is recirculated to the HP-EGR passage 15. Thus, the SOF (soluble organic fraction) in the EGR gas Ge in the HP-EGR passage 15 can be decreased. Accordingly, it is possible to decrease the influence of the SOF such as clogging of an EGR cooler (not illustrated) and an EGR valve (not illustrated) of the HP-EGR passage 15.

Further, the EGR gas Ge to be recirculated for LP (low-pressure)-EGR is separated downstream of the previous-stage SCR device 23 or the subsequent-stage SCR device 24 (the subsequent-stage SCR device 24 in FIGS. 1 to 4). In this way, the EGR gas Ge after passing through the previous-stage oxidation catalyst devices 21 (or the first oxidation catalyst devices 21a and the second oxidation catalyst device 21b in FIGS. 3 and 4), the DPF device 22, the previous-stage SCR device 23, and the subsequent-stage SCR device 24 is recirculated to the LP-EGR passage 16. Thus, the SOF, PMs, and $NH_3$ in the EGR gas Ge in the LP-EGR passage 16 can be decreased. Accordingly, it is possible to decrease closing, corrosion, and the like of an EGR cooler (not illustrated) and an EGR valve (not illustrated) of the LP-EGR passage 16.

The exhaust gas purification systems 1, 1A further include a temperature sensor 31 which measures a DPF inlet temperature T, which is the temperature of the exhaust gas at the inlet of the DPF device 22, a differential pressure sensor 32 which measures a differential pressure $\Delta P$ between upstream and downstream sides of the DPF device 22, and a NOx concentration sensor 33 which measures the concentration of NOx downstream of the subsequent-stage SCR device 24. The exhaust gas purification systems 1, 1A further include a control device (not illustrated) including HC feed controlling means for inputting the measurement values of the temperature sensor 31 and differential pressure sensor 32 and feeding HC (hydrocarbons) as a fuel into the previous-stage oxidation catalyst devices 21 by post-injection inside the cylinders, and urea feed controlling means (ammonia-based solution feed controlling means) for feeding the urea L for producing $NH_3$ for NOx reduction in the previous-stage SCR device 23 and the subsequent-stage SCR device 24, from the urea injection nozzle 25 into the exhaust gas G. Usually, a control device (not illustrated) called an ECU (engine control unit) which controls the entire operation of the engine 10 functions also as the above control device. In other words, the HC feed controlling means and the urea feed controlling means are incorporated in the control device (ECU).

Figure 7:
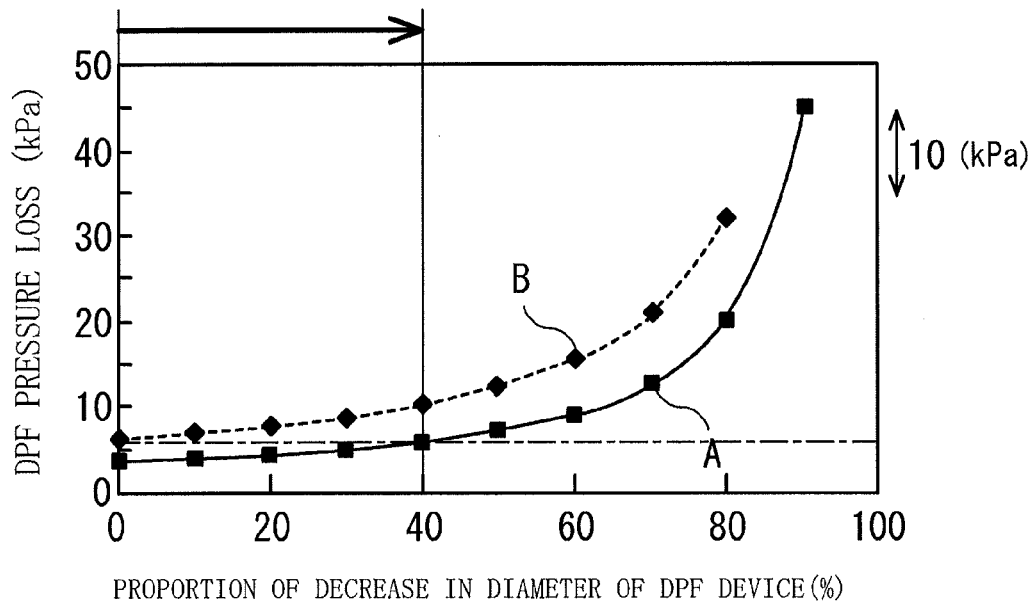
FIG. 7 is a graph illustrating the relationship between the proportion of decrease in the diameter of a DPF device and DPF pressure loss in Example and Conventional Example.
Figure 8:
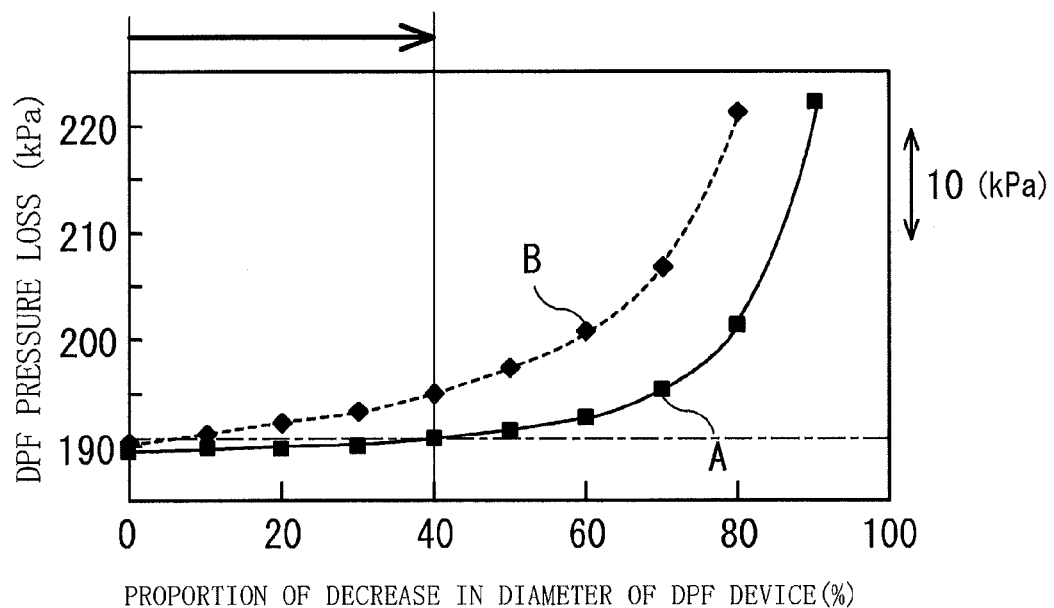
FIG. 8 is a graph illustrating the relationship between the proportion of decrease in the diameter of the DPF device and exhaust manifold pressure in Example and Conventional Example.
Figure 9:
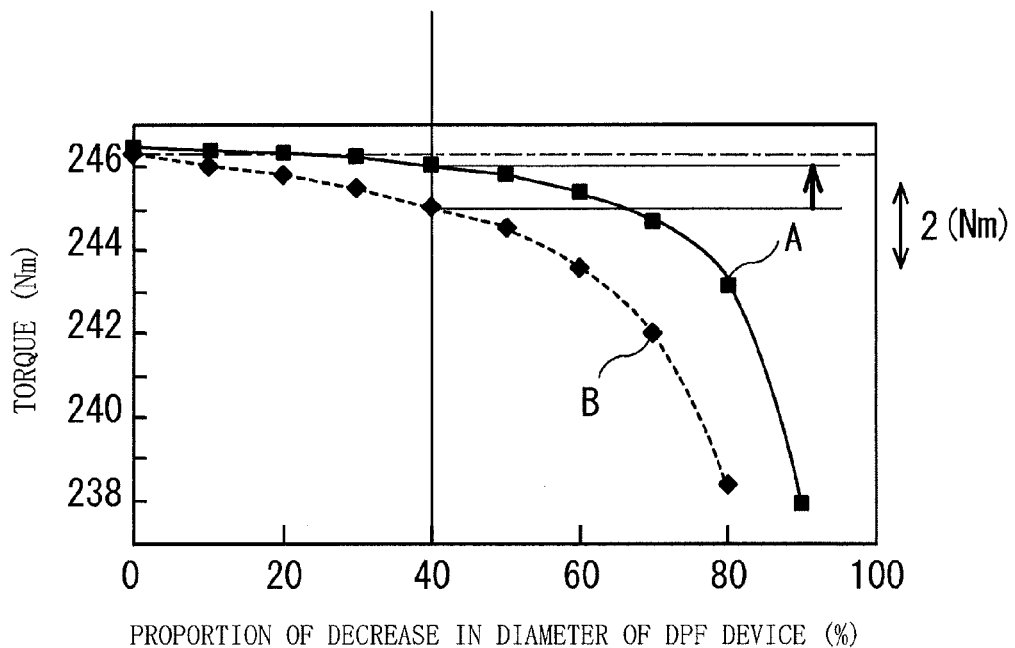
FIG. 9 is a graph illustrating the relationship between the proportion of decrease in the diameter of the DPF device and engine torque in Example and Conventional Example.

FIGS. 7 to 9 illustrate DPF pressure loss and the like in Example A in which the DPF device 22 is disposed upstream of the turbine 14 and in Conventional Example B in which the DPF device 22 is disposed downstream of the turbine. In Example A, the DPF pressure loss is decreased, the pressure inside the exhaust manifold 12 is decreased, and the torque is increased, as compared to Conventional Example B. In other words, since there is no influence of the turbine expansion ratio, the influence of increase in DPF pressure loss on the exhaust manifold internal pressure and the torque is relatively smaller in Example A than in Conventional Example B.

Figure 10:
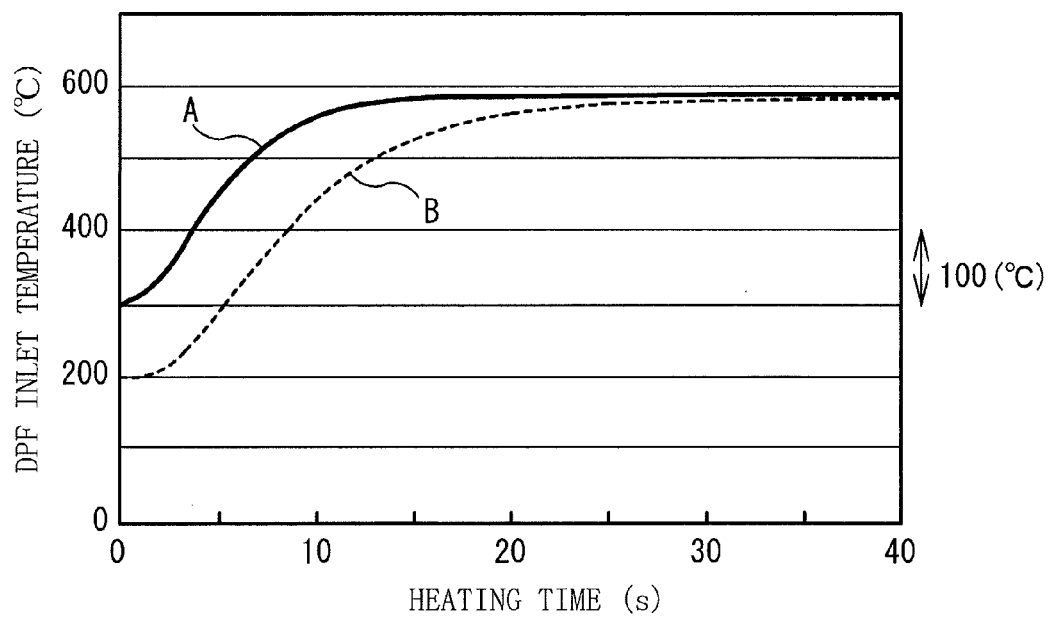
FIG. 10 is a graph illustrating the time for which the DPF device is heated in Example and Conventional Example.

As can be seen from these FIGS. 7 to 9, provided that the torque, the exhaust manifold internal pressure, and the like that influence the engine performance are substantially the same and that the length of the DPF device 22 is the same, the diameter of the DPF device 22 can be decreased by about 40% in Example A as compared to Conventional Example B. As a result, as illustrated in FIG. 10, the DPF device 22 can be heated within a shorter time in Example A than in Conventional Example B, and therefore the time for heating to a predetermined temperature can be shortened.

Figure 11:
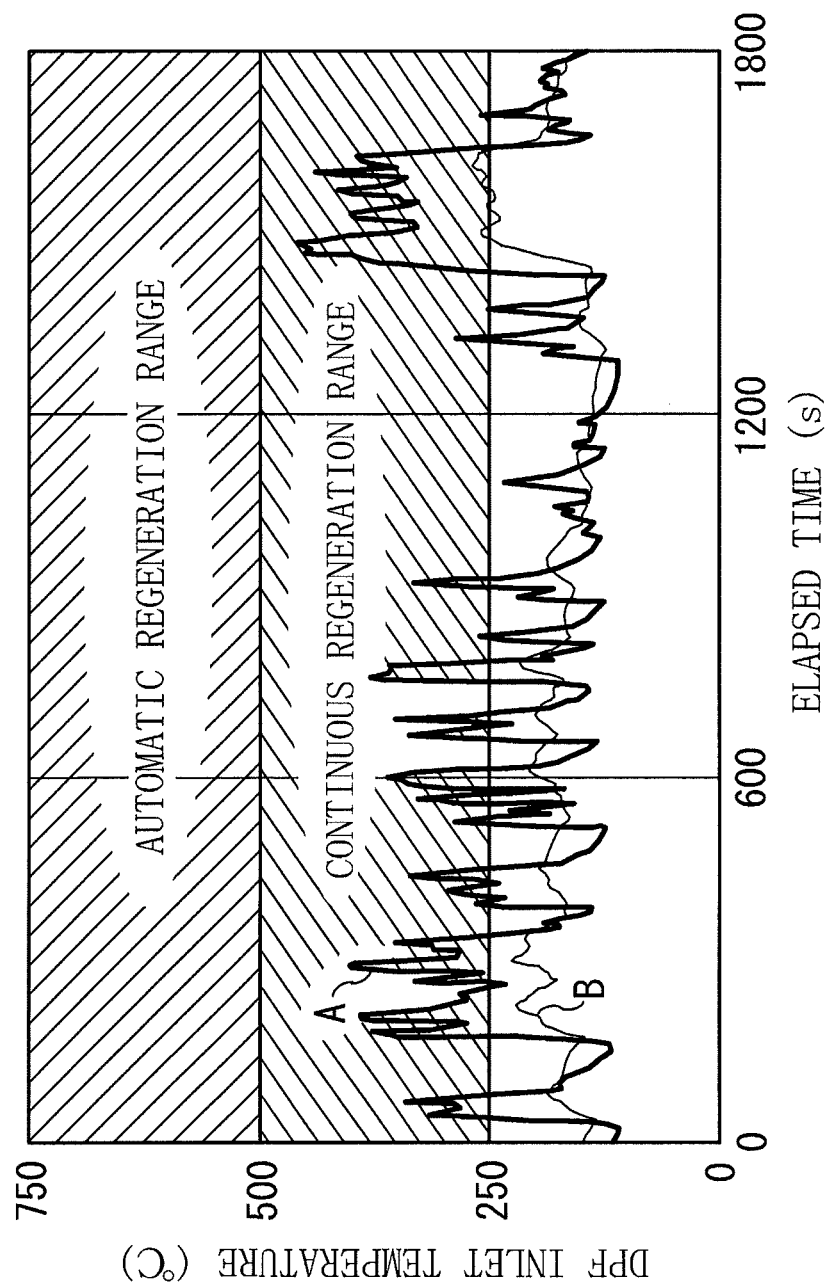
FIG. 11 is a graph illustrating DPF inlet temperature in the JE05 mode in Example and Conventional Example.

Moreover, in the present invention, since the DPF device 22 is positioned upstream of the turbine 14, the DPF device 22 can be disposed closer to the engine body 11 than in the conventional technique. As a result, as illustrated in FIG. 11, the DPF inlet temperature T can be kept higher by 100° C. or more.

Figure 12:
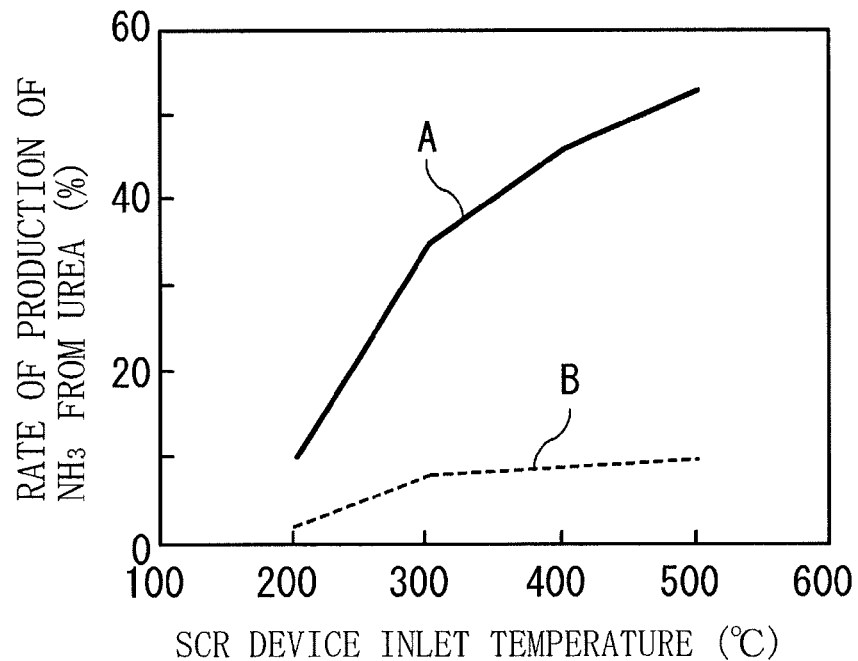
FIG. 12 is a graph illustrating the relationship between SCR device inlet temperature and the rate of production of $NH_3$ from urea in Example and Conventional Example.
Figure 13:
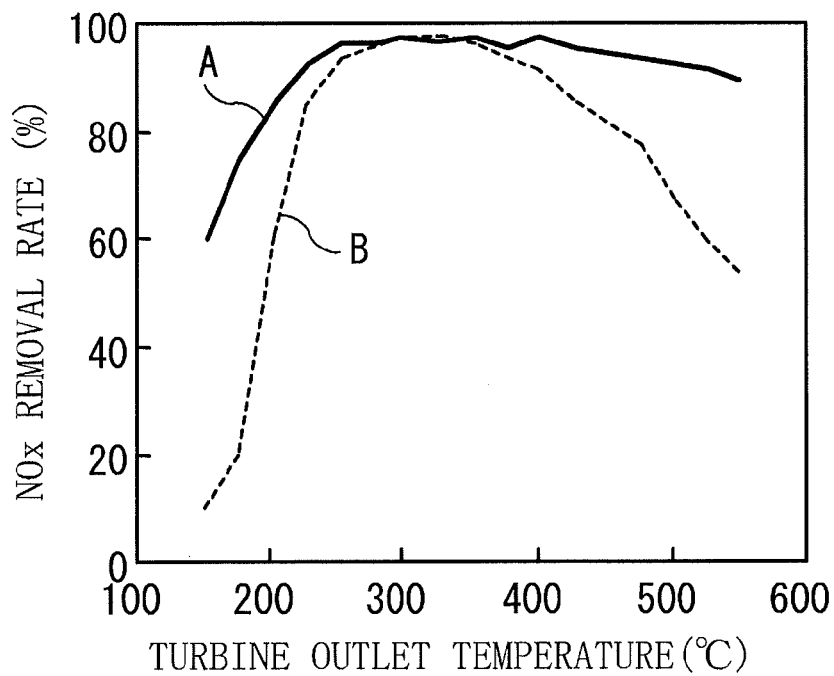
FIG. 13 is a graph illustrating the relationship between turbine inlet temperature and the NOx removal rate in Example and Conventional Example.

Further, since the urea injection nozzle 25 can also be disposed closer to the engine body 11 than in the conventional technique, the temperature at the urea injection position can be kept higher than in Conventional Example B. In particular, in the case of the configuration in which the urea injection nozzle 25 is disposed upstream of the DPF device 22 as illustrated in FIGS. 1 and 3, the temperature at the urea injection position can be kept higher by 100° C. or more than in Conventional Example B, like the DPF inlet temperature T illustrated in FIG. 11. As a result, as illustrated in FIG. 12, the rate of production of $NH_3$ from urea with respect to the temperature at the inlet of the previous-stage SCR device 23 improves significantly in Example A as compared to Conventional Example B. Thus, as illustrated in FIG. 13, the NOx removal rate with respect to the turbine outlet temperature improves as well.

Next, HC (hydrocarbon) feed control in the above-described exhaust gas purification systems 1, 1A will be described. In the present invention, in view of the superiority of the above-described configuration, HC feed to each previous-stage oxidation catalyst device 21 is controlled such that HC adsorption and oxidation in the previous-stage oxidation catalyst device 21 raise the temperature of the exhaust gas G that flows into the DPF device 22, to thereby set the DPF inlet temperature T, which is the temperature of the exhaust gas at the inlet of the DPF device 22, to a temperature (250° to 500° C.) that allows continuous regeneration. In this way, the frequency and duration at and for which continuous regeneration can be performed are increased.

Figure 5:
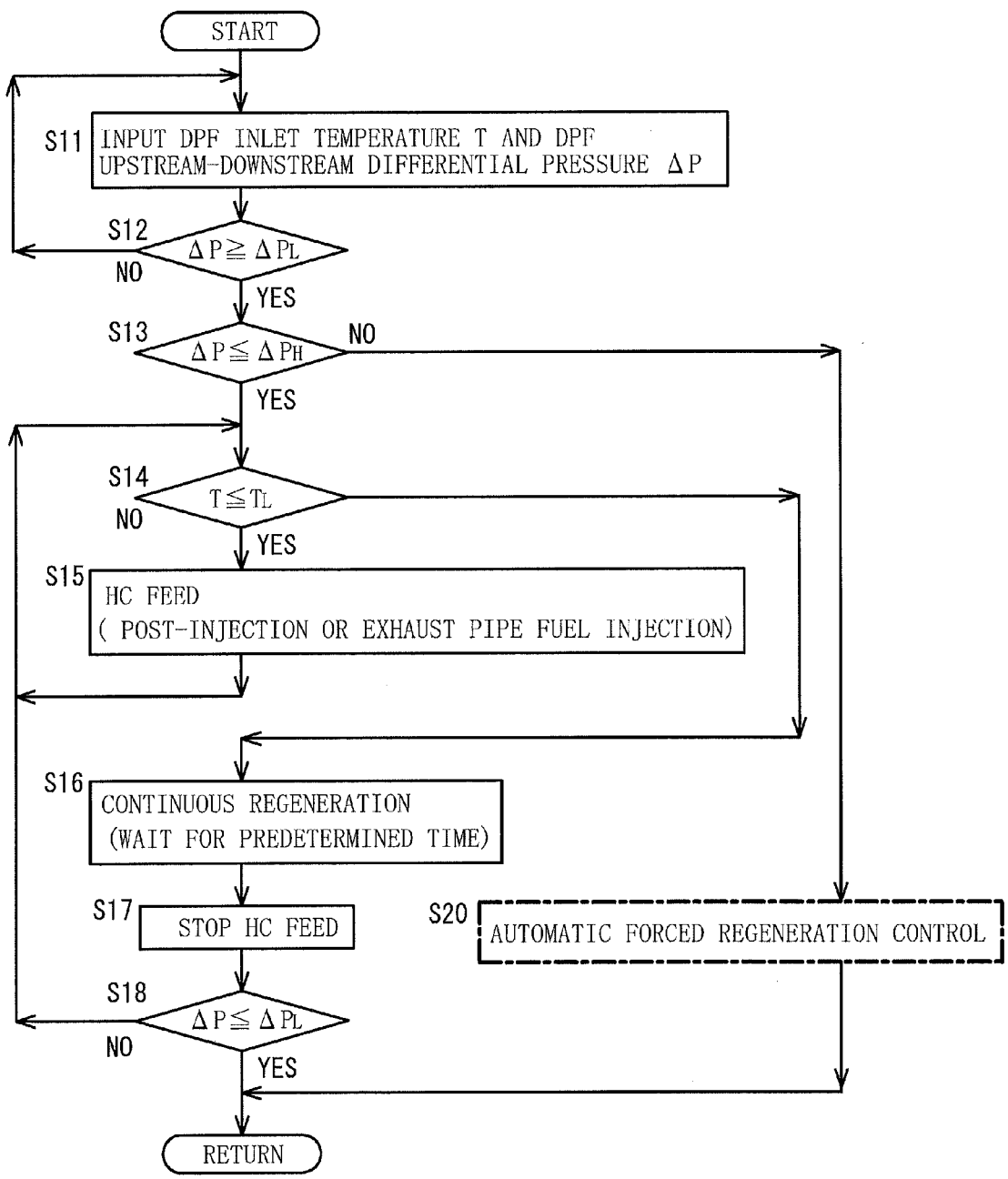
FIG. 5 is a chart illustrating one exemplary control flow of hydrocarbon feed control of the present invention.

This HC feed control can be performed through a control flow exemplarily illustrated in FIG. 5. The control flow in FIG. 5 is illustrated as a control flow which is repeatedly called and executed by a higher control flow which is actuated upon start of operation of the engine 10; the control flow is discontinued and returns to the higher control flow upon stop of operation of the engine 10, and stops as the higher control flow stops.

When the control flow in FIG. 5 is called by the higher control flow and starts, in step S11, the DPF inlet temperature T is inputted from the temperature sensor 31, and the DPF upstream-downstream differential pressure $\Delta P$, which is the differential pressure between the upstream and downstream sides of the DPF device 22, is inputted from the differential pressure sensor 32. In the next step S12, it is determined whether or not the DPF upstream-downstream differential pressure $\Delta P$ is equal to or higher than a continuous regeneration determination differential pressure $\Delta PL$. If the DPF upstream-downstream differential pressure $\Delta P$ is equal to or higher than the continuous regeneration determination differential pressure $\Delta PL$ (YES), it is determined in the next step S13 whether or not the DPF upstream-downstream differential pressure $\Delta P$ is equal to or lower than an automatic forced regeneration determination differential pressure $\Delta PH$. If the DPF upstream-downstream differential pressure $\Delta P$ is equal to or lower than the automatic forced regeneration determination differential pressure $\Delta PH$ (YES), the flow proceeds to step S14.

Note that if it is determined in step S12 that the DPF upstream-downstream differential pressure $\Delta P$ is lower than the continuous regeneration determination differential pressure $\Delta PL$ (NO), the flow returns to step S11. Moreover, if it is determined in step S13 that the DPF upstream-downstream differential pressure $\Delta P$ is higher than the automatic forced regeneration determination differential pressure $\Delta PH$ (NO), the flow proceeds to step S20, in which automatic forced regeneration control is performed to forcibly regenerate the DPF device 22. Then, the flow returns to the higher control flow, and the control flow in FIG. 5 is called again by the higher control flow and is repeated.

In step S14, it is determined whether or not the DPF inlet temperature T is equal to or lower than a continuous regeneration control start temperature TL. If the DPF inlet temperature T is equal to or lower than the continuous regeneration control start temperature TL (YES), HC feed is performed in step S15 in which HC is fed to the previous-stage oxidation catalyst devices 21 by post-injection for a predetermined time $\Delta t1$ (a time set in advance according to the intervals of the determination of the DPF upstream-downstream differential pressure $\Delta P$ and the determination of the DPF inlet temperature T). Thereafter, the flow returns to step S14. If the DPF inlet temperature T is higher than the continuous regeneration control start temperature TL (NO) in step S14, the flow proceeds to step S16.

In step S16, since the DPF inlet temperature T is higher than the continuous regeneration control start temperature TL, the flow waits for a predetermined time $\Delta t2$, during which continuous regeneration of the DPF device 22 is performed. Thereafter, the flow proceeds to step S17, in which, if HC feed is being performed, the HC feed is stopped, and if no HC feed is being performed, HC feed is kept stopped, and the flow proceeds to step S18.

In step S18, it is determined whether or not the DPF upstream-downstream differential pressure $\Delta P$ is equal to or lower than the continuous regeneration determination differential pressure $\Delta PL$. If the DPF upstream-downstream differential pressure $\Delta P$ is neither equal to nor lower than the continuous regeneration determination differential pressure $\Delta PL$ (NO), the flow returns to step S14 to continue the continuous regeneration. If the DPF upstream-downstream differential pressure $\Delta P$ is equal to or lower than the continuous regeneration determination differential pressure $\Delta PL$ (YES), the continuous regeneration is considered to have been completed and to be unrequired. Thus, the flow returns to the higher control flow, and the control flow in FIG. 5 is called again by the higher control flow, and starts and is repeated again.

It is determined in steps S11 to S13 whether or not to feed HC for heating the exhaust gas for continuous regeneration and steps S14, S15 are repeated, to thereby raise the DPF inlet temperature T until it exceeds the continuous regeneration control start temperature TL. Then, continuous regeneration is performed in step S16, and the HC feed is stopped in step S17 to prevent unnecessary HC consumption. Thereafter, it is determined in step S18 whether or not to end the continuous regeneration.

By performing the control flow in FIG. 5, it is possible to perform control in which HC is fed into the exhaust gas G upstream of the previous-stage oxidation catalyst devices 21 by post-injection via injection inside the cylinders in the case where the DPF upstream-downstream differential pressure $\Delta P$ of the DPF device 22 is equal to or higher than the continuous regeneration determination differential pressure $\Delta PL$ but equal to or lower than the automatic forced regeneration determination differential pressure $\Delta PH$ and also the DPF inlet temperature T of the DPF device 22 is equal to or lower than the continuous regeneration control start temperature TL. Note that instead of the post-injection, exhaust pipe fuel injection may be employed in which fuel is injected directly into the exhaust pipes upstream of the previous-stage oxidation catalyst devices 21.

Figure 14:
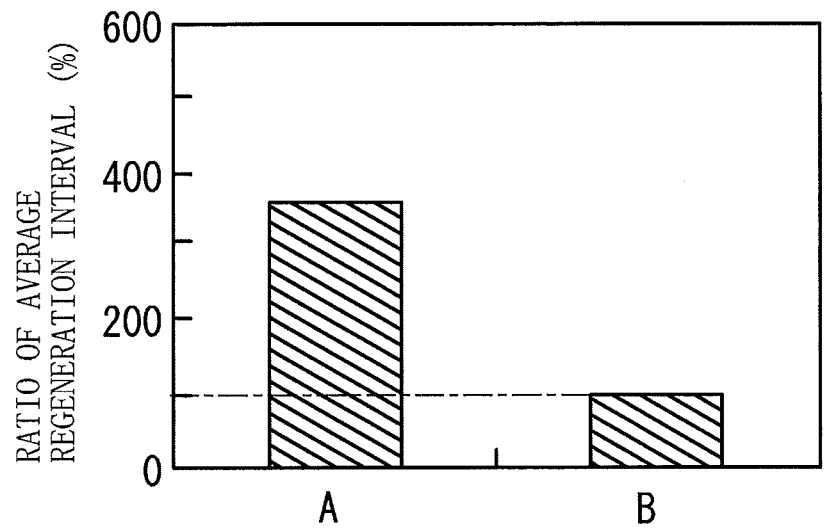
FIG. 14 is a graph illustrating an average DPF regeneration interval in Example and Conventional Example.
Figure 15:
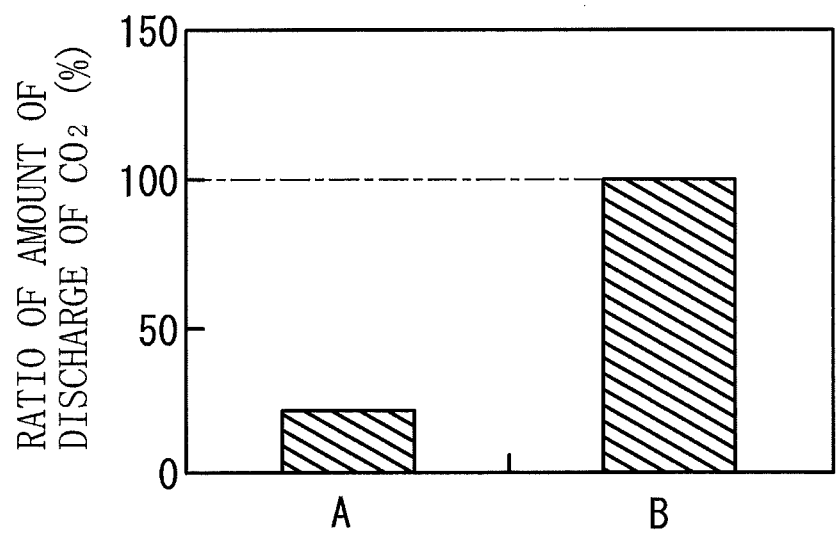
FIG. 15 is a graph illustrating the ratio of the amount of discharge of $CO_2$ between Example and Conventional Example.

As illustrated in FIG. 14, by this HC feed control, the interval of automatic forced regeneration of the DPF device 22 can be greatly extended in Example A of the present invention as compared to Conventional Example B of the conventional technique. Further, as illustrated in FIG. 15, the amount of discharge of $CO_2$ during DPF regeneration can be significantly decreased in Example A as compared to Conventional Example B. Note that a material capable of adsorption of a large amount of CO, such as $CeO_2$ (cerium oxide) or $ZrO_2$ (zirconium dioxide), may be used for the oxidation catalyst of each previous-stage oxidation catalyst device 21. In this way, the amount of heat production of the previous-stage oxidation catalyst device 21 can further be increased.

By this HC feed control, the effect of HC adsorption and oxidation of the oxidation catalyst in each previous-stage oxidation catalyst device 21 upstream of the DPF device 22 can be exhibited effectively. Thus, when continuous regeneration of the DPF device 22 is needed, the temperature T of the exhaust gas that flows into the DPF device 22 (temperature of the exhaust gas at the inlet) can be raised above the temperature TL above which continuous regeneration is possible. In this way, the interval of automatic forced regeneration control for the DPF device 22 can be extended. Accordingly, the amount of discharge of $CO_2$ during regeneration of the DPF device 22 can further be decreased.

Next, urea feed control in the above-described exhaust gas purification systems 1, 1A will be described. In the present invention, in view of the superiority of the above-described configuration, the urea feed from the urea injection nozzle 25 to the previous-stage SCR device 23 and the subsequent-stage SCR device 24 is controlled such that NOx in the exhaust gas is reduced in the previous-stage SCR device 23 and the subsequent-stage SCR device 24 with $NH_3$ produced from the urea L.

Figure 6:
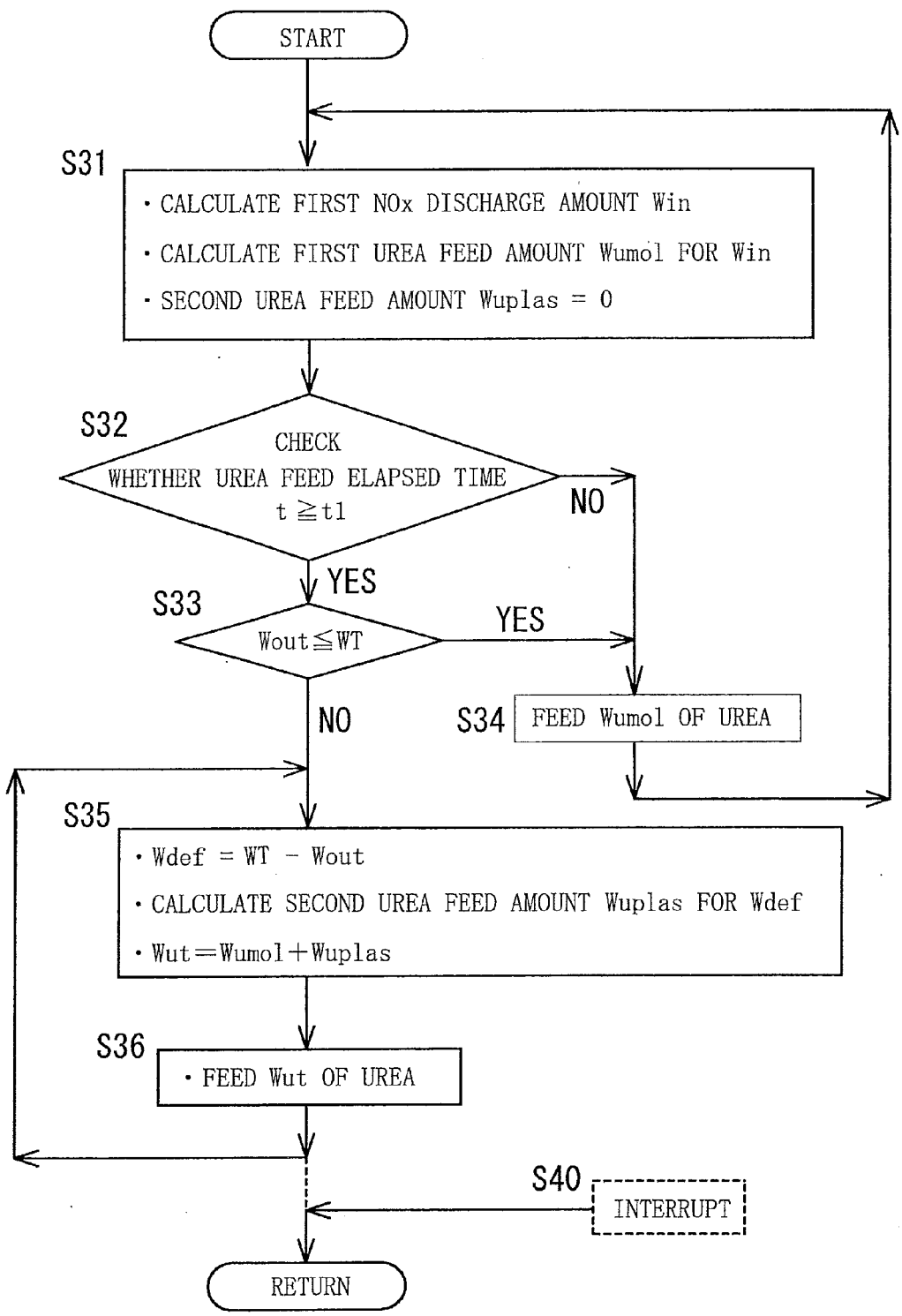
FIG. 6 is one exemplary control flow of urea feed control of the present invention.

This urea feed control can be performed through a control flow exemplarily illustrated in FIG. 6. The control flow in FIG. 6 is illustrated as a control flow which is called and executed by a higher control flow that is actuated upon start of operation of the engine 10; the control flow is discontinued by an interruption of step S40 upon stop of operation of the engine 10, returns to the higher control flow, and stops as the higher control flow stops.

When the control flow in FIG. 6 is called by the higher control flow and starts, in step S31, a first NOx discharge amount Win is measured or calculated. The first NOx discharge amount Win is the amount of discharge of NOx representing the NOx (NO, $NO_2$) from the engine body 11 converted into NO (the amount of discharge of the engine-out NOx). It is found from a measured concentration of NOx in the exhaust gas G and a calculated amount of exhaust gas, or calculated based, for example, on a calculation involving referring to preset map data based on the operating state of the engine 10.

Further, in step S31, a first urea feed amount Wumol for the first NOx discharge amount Win is calculated. The first urea feed amount Wumol is obtained by calculating the amount of $NH_3$ for the first NOx discharge amount that is necessary for NO reduction at an equivalence ratio of $NH_3$ to NO of 1.0 to 1.3 (a value found and set in advance through a test or the like), and setting the amount of urea for producing this amount of $NH_3$ as the first urea feed amount Wumol. Then, the counting of a urea feed elapsed time t is started. Also, a second urea feed amount Wuplas to be used later is set to zero.

Then, in step 32, it is determined whether or not the urea feed elapsed time t that is being counted has reached a preset determination time t1. The determination time t1 is set to a time long enough for the exhaust gas G to reach the NOx concentration sensor 33 downstream of the subsequent-stage SCR device 24, the exhaust gas G containing the urea L which has been fed thereinto upstream of the DPF device 22 from the urea injection nozzle 25. This time can be set based on an experimental value or a value calculated from the flow rate of the exhaust gas or the like.

If the urea feed elapsed time t has reached the determination time t1 (YES) in step S32, the flow proceeds to step S33. Alternatively, if the urea feed elapsed time t has not reached the determination time t1 (NO), the flow proceeds to step S34, in which the urea L of the first urea feed amount Wumol is fed into the exhaust gas G upstream of the turbine 14 (further upstream of the DPF device 22 in FIGS. 1 and 3) from the urea injection nozzle 25 for a preset time (a time based on the time interval of the determination in step S32) Δt1. Thereafter, the flow returns to step S31.

In step S33, the measurement value of the NOx concentration sensor 33 downstream of the subsequent-stage SCR device 24 is inputted, and a measured discharge amount Wout is calculated from the NOx concentration thus inputted and the amount of exhaust gas. Note that the amount of exhaust gas can be calculated from the operating state of the engine 10 or the amount of intake measured with an intake sensor (MAF sensor: not illustrated) and the amount of fuel injection.

The measured discharge amount Wout and a target discharge amount WT, which is a target value for decreasing NOx discharge, are compared. If the measured discharge amount Wout is equal to or smaller than the target discharge amount WT (YES), the first urea feed amount Wumol is determined as a sufficient amount of urea, and the flow proceeds to step S34, in which the urea L of the first urea feed amount Wumol is fed for the preset time Δt1. Thereafter, the flow returns to step S31.

On the other hand, if it is determined in step S33 that the measured discharge amount Wout is larger than the target discharge amount WT (NO), the first urea feed amount Wumol is determined as an insufficient amount of urea, and the flow proceeds to step S35.

In step S35, the measured discharge amount Wout is newly calculated, and an discharge amount difference Wdef being the difference between the target discharge amount WT and the measured discharge amount Wout is calculated (Wdef=WT−Wout). Moreover, the amount of $NH_3$ is calculated for the discharge amount difference Wdef which is necessary for reduction of NOx of an amount equal to the discharge amount difference Wdef, and the second urea feed amount Wuplas is calculated by using a urea amount Wud for producing this amount of $NH_3$; in other words, Wuplas=Wuplas+Wud. Thus, the second urea feed amount Wuplas taking the discharge amount difference Wdef into account can be calculated. Furthermore, a total urea feed amount Wut being the sum of the first urea feed amount Wumol and the second urea feed amount Wuplas is calculated (Wut=Wumol+Wuplas).

In the next step S36, the total urea feed amount Wut of urea L is fed for a preset time (a time based on the time interval of update of the measured value of NOx concentration in step S35) Δt2. The flow then returns to step S35. These steps S35 to S36 are repeated to feed the urea L of the total urea feed amount Wut into the exhaust gas G upstream of the turbine 14 (further upstream of the DPF device 22 in FIGS. 1 and 3). When an interruption of step S40 occurs upon stop of the engine 10, the flow returns to the higher control flow, and the control flow in FIG. 6 ends along with the higher control flow.

According to the control described above, the first urea feed amount Wumol of urea L can be fed in steps S31 to S34 in the case where the urea feed elapsed time t has not reached the predetermined determination time t1 (NO), or the measured discharge amount Wout is equal to or smaller than the target discharge amount WT (YES); on the other hand, the urea L of the total urea feed amount Wut, which is the sum of the first urea feed amount Wumol and the second urea feed amount Wuplas, can be fed in steps S35 and S36 in the case where the urea feed elapsed time t has reached the predetermined determination time t1 (YES), and the measured discharge amount Wout is larger than the target discharge amount WT (NO).

In other words, urea injection control can be performed which includes: considering an amount of feed of urea, which is the amount of urea expected to be consumed by the previous-stage SCR device 23, as the first urea feed amount Wumol which allows an equivalence ratio of the amount of ammonia ($NH_3$) as urea to the amount of the engine-out NOx of 1 or greater; further, estimating the measured discharge amount Wout of NOx downstream of the subsequent-stage SCR device 24 from the measured NOx concentration; calculating the discharge amount difference Wdef estimated as an insufficient amount for decreasing the NOx to the target discharge amount WT; calculating the second urea feed amount Wuplas to be consumed by the subsequent-stage SCR device 24; and feeding the urea L of the total urea feed amount Wut, the total urea feed amount Wut being obtained by adding the first urea feed amount Wumol and the second urea feed amount Wuplas.

Figure 16:
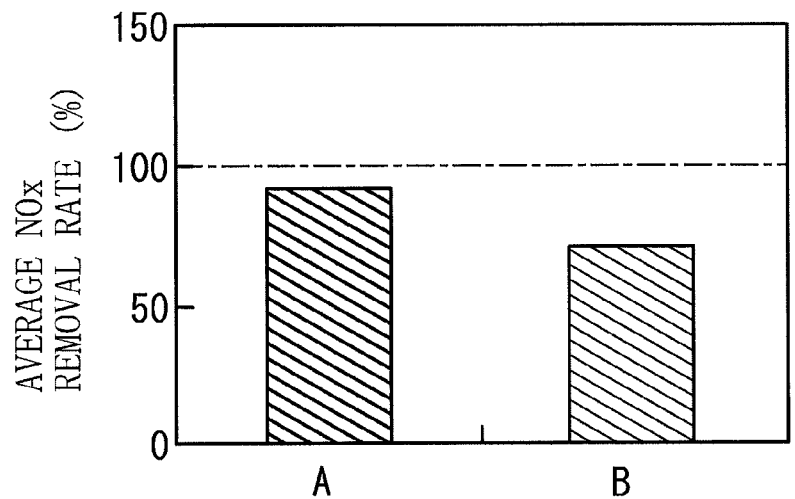
FIG. 16 is a graph illustrating an average NOx removal rate in Example and Conventional Example.
Figure 17:
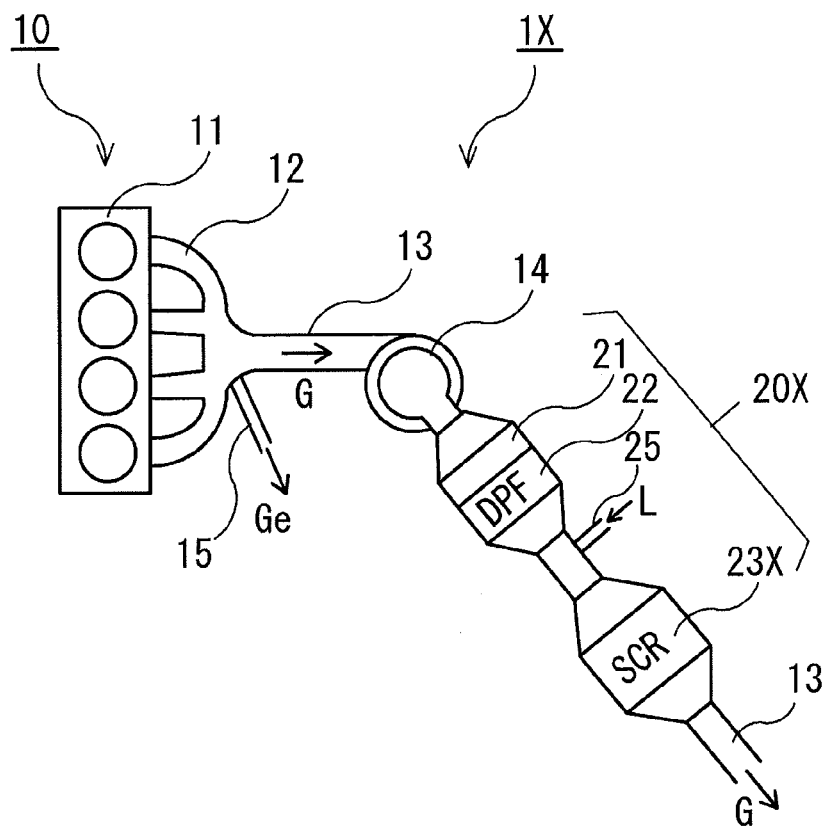
FIG. 17 is a view illustrating an exemplary configuration of an exhaust gas purification system of a conventional technique.

As a result, as illustrated in FIGS. 12, 13, and 16, high NOx removal performance can be obtained in wide ranges from low to high temperatures in Example A of the present invention as compared to Conventional Example B of the conventional technique. In particular, the NOx removal rate of the previous-stage SCR device 23 and the subsequent-stage SCR device 24 is improved by 30% or more in terms of JE05 mode average. Specifically, for the previous-stage SCR device 23, it is difficult to control adsorption of urea-derived substances, and therefore increasing the $NH_3$ production rate and causing a reaction of NOx and $NH_3$ at the surface of the SCR catalyst allow improvement in removal rate.

Next, description will be given of an advantage for corrosion by SOx (sulfur oxides) achieved by disposing the urea injection nozzle 25 upstream of the DPF device 22 as illustrated in FIGS. 1 and 3. The urea L sprayed into the exhaust gas G from the urea injection nozzle 25 produces $NH_3$ (ammonia) mainly through a pyrolysis reaction of the urea "$(NH_2)_2CO \rightarrow NH_3 + HNCO$" and a hydrolysis reaction of the isocyanic acid produced by the pyrolysis reaction "$HNCO + H_2O \rightarrow NH_3 + CO_2$". The $NH_3$ produced from the urea undergoes a reaction of "$2NH_3 + SO_4 \rightarrow (NH_4)_2SO_4$" with SOx in the exhaust gas, thereby producing $(NH_4)_2SO_4$ (ammonium sulfate).

Further, the $(NH_4)_2SO_4$ undergoes a reaction of "$(NH_4)_2SO_4 + CaCO_3 \rightarrow (NH_4)_2SO_3 + CaSO_4$" with $CaCO_3$ (calcium carbonate) which is an ash component produced after the combustion of PMs in the downstream (subsequent-stage) DPF device 22. The $(NH_4)_2CO_3$ (ammonium carbonate) thus produced decomposes at 58° C. or higher through a pyrolysis reaction "$(NH_4)_2CO_3 \rightarrow 2NH_3 + H_2O + CO_2$". The $NH_3$ produced by this reaction is captured by the previous-stage SCR device 23 and the subsequent-stage SCR device 24 downstream of the DPF device 22 and used for a NOx removal reaction.

The $(NH_4)_2SO_4$ produced by the reaction of $NH_3$ and $SO_4$ or the like is a neutralized product and thus has no corrosive properties. This solves the problem of corrosion of the turbine 14 and the exhaust passage 13 downstream of the DPF device 22 by SOx, and also solves the problem of corrosion of the EGR passage 16, the EGR valve (not illustrated) and the EGR cooler (not illustrated) for the LP (low pressure)-EGR in which the exhaust gas after the reaction of $NH_3$ and $SO_4$ or the like is used as the EGR gas Ge.

Thus, according to the exhaust gas purification systems 1, 1A and the exhaust gas purification method described above, the urea injection nozzle 25 is disposed upstream of the DPF device 22, and therefore the position of the urea injection nozzle 25 can be closer to the engine body 11. Thus, the temperature of the exhaust gas G to be fed with the urea L can be kept high, and therefore the rate of production of $NH_3$ (ammonia) from the urea L can be improved.

Further, since the DPF device 22 is disposed upstream of the turbine 14, the position of the DPF device 22 is close to the exhaust ports, and therefore the temperature of the DPF device 22 can be kept high. This makes it possible to increase the frequency of continuous regeneration and decrease the size. The decrease in the size of the DPF device 22 can shorten the heating time during regeneration. Thus, it is possible to decrease the amount of discharge of $CO_2$ during regeneration of the DPF device 22 and also to increase the degree of freedom in layout.

Further, since the DPF device 22 is disposed in such a way as not to be influenced by ash originating from the oil of the turbine 14, it is possible to avoid the influence of the ash on clogging of the DPF device 22.

In addition, in the case where the urea injection nozzle 25, the DPF device 22, and the turbine 14 are disposed in this order from the upstream side, SOx produced by combustion in the cylinders can be changed to $CaSO_4$, which has low corrosive properties. Thus, it is possible to suppress corrosion of the turbine by SOx.

Further, by performing the hydrocarbon feed control, the temperature of the exhaust gas flowing into the DPF device 22 can be raised to temperatures that allow continuous regeneration of the DPF device 22, when such continuous regeneration is being needed. Thus, the interval of the automatic forced regeneration control for the DPF device 22 can be extended. Accordingly, the amount of discharge of $CO_2$ during regeneration of the DPF device 22 can further be decreased.

Furthermore, by the urea feed control, the urea L can be fed to the DPF device 22, the previous-stage SCR device 23, and the subsequent-stage SCR device 24 as a more appropriate amount of ammonia-based solution. Accordingly, it is possible to efficiently remove NOx in wide ranges from low to high temperatures and to high flow rates.

Thus, by combining the arrangement of the exhaust gas purification units, the hydrocarbon feed control, and the ammonia-based solution feed control of the present invention, it is possible to improve the NOx removal rate in wide ranges from low temperatures and rates to high temperatures and flow rates.

The exhaust gas purification system and the exhaust gas purification method of the present invention are capable of improving the NOx removal rate in wide ranges from low to high temperatures and to high flow rates, and also keeping the temperature of a DPF device high to increase the time and frequency of continuous regeneration, thus decreasing the frequency of forced regeneration of the DPF device and the amount of discharge carbon dioxide ($CO_2$) produced during the forced regeneration, by using a configuration that improves the production rate of ammonia ($NH_3$) and a two-stage configuration that includes a previous-stage NOx selective reduction catalyst device for high temperatures and a subsequent-stage NOx selective reduction catalyst device for low temperatures. Thus, the exhaust gas purification system and the exhaust gas purification method of the present invention can be utilized as an exhaust gas purification system and an exhaust gas purification method for internal combustion engines mounted on automobiles and the like.

The invention claimed is:

1. An exhaust gas purification system for removing nitrogen oxides in an exhaust gas of an internal combustion engine, comprising:
   an ammonia-based solution feeder, a previous-stage NOx selective reduction catalyst device, and a subsequent-stage NOx selective reduction catalyst device disposed in an exhaust system of the internal combustion engine in this order from an exhaust port side, a NOx selective reduction catalyst of the previous-stage NOx selective reduction catalyst device made of a catalyst containing a rare earth composite oxide, and a NOx selective reduction catalyst of the subsequent-stage NOx selective reduction catalyst device made of a zeolite catalyst; and a controller for the ammonia-based solution feeder, which controller is configured to— find, from an equivalence ratio of a chemical equation, an amount which enables reduction of an amount of NOx discharged from the internal combustion engine, calculate a first ammonia-based solution amount larger than the amount enabling the reduction, calculate a second ammonia-based solution amount from a difference between a NOx target discharge amount from the internal combustion engine, and an amount of NOx measured downstream of the subsequent-stage NOx selective reduction catalyst device, when an amount of NOx measured downstream of the previous-stage NOx selective reduction catalyst device is larger than the NOx target discharge amount of the internal combustion engine, set an amount of an ammonia-based solution to be fed to the exhaust system based on the sum of the first ammonia-based solution amount and the second ammonia-based solution amount, and feed the set amount of the ammonia-based solution from the ammonia-based solution feeder.

2. An exhaust gas purification method for removing nitrogen oxides in an exhaust gas of an internal combustion engine by using an exhaust gas purification system in which an ammonia-based solution feeder, a previous-stage NOx selective reduction catalyst device, and a subsequent-stage NOx selective reduction catalyst device are disposed in an exhaust system of the internal combustion engine in this order from an exhaust port side, wherein the method comprises:

measuring an amount of NOx downstream of the previous-stage NOx selective reduction catalyst device;

measuring an amount of NOx downstream of the subsequent-stage NOx selective reduction catalyst device;

finding, from an equivalence ratio of a chemical equation, an amount which enables reduction of an amount of NOx discharged from the internal combustion engine;

calculating a first ammonia-based solution amount larger than the amount enabling the reduction;

calculating a second ammonia-based solution amount from a difference between a NOx target discharge amount from the internal combustion engine, and the amount of NOx measured downstream of the subsequent-stage NOx selective reduction catalyst device, when the amount of NOx measured downstream of the previous-stage NOx selective reduction catalyst device is larger than the NOx target discharge amount of the internal combustion engine;

setting an amount of an ammonia-based solution to be fed to the exhaust system based on the sum of the first ammonia-based solution amount and the second ammonia-based solution amount; and feeding the set amount of the ammonia-based solution from the ammonia-based solution feeder into the exhaust system to reduce the amount of the NOx discharged from the internal combustion engine.

3. An exhaust gas purification system for removing particulate matter and nitrogen oxides in an exhaust gas of an internal combustion engine, comprising:

a previous-stage oxidation catalyst device, a diesel particulate filter device, a turbine of a turbocharger, a previous-stage NOx selective reduction catalyst device, and a subsequent-stage NOx selective reduction catalyst device disposed in an exhaust system of the internal combustion engine in this order from an exhaust port side, an ammonia-based solution feeder disposed between the previous-stage oxidation catalyst device and the diesel particulate filter device or between the diesel particulate filter device and the turbine, and a NOx selective reduction catalyst of the previous-stage NOx selective reduction catalyst device made of a catalyst containing a rare earth composite oxide, and a NOx selective reduction catalyst of the subsequent-stage NOx selective reduction catalyst device made of a zeolite catalyst; and an ammonia-based solution feed controller for finding, from an equivalence ratio of a chemical equation, an amount which enables reduction of an amount of NOx discharged from the internal combustion engine, calculating a first ammonia-based solution amount larger than the amount enabling the reduction, calculating a second ammonia-based solution amount from a difference between a NOx target discharge amount from the internal combustion engine, and an amount of NOx measured downstream of the subsequent-stage NOx selective reduction catalyst device, setting an amount of an ammonia-based solution to be fed to the exhaust system based on the sum of the first ammonia-based solution amount and the second ammonia-based solution amount, and feeding the ammonia-based solution from the ammonia-based solution feeder.

4. The exhaust gas purification system according to claim 3, further comprising:

a hydrocarbon feed controller for performing control in which a hydrocarbon is fed into the exhaust gas upstream of the previous-stage oxidation catalyst device by post injection via injection inside a cylinder or by exhaust pipe fuel injection in a case where a differential pressure between upstream and downstream sides of the diesel particulate filter device is equal to or higher than a continuous regeneration determination differential pressure but equal to or lower than an automatic forced regeneration determination differential pressure, and a temperature of the exhaust gas at an inlet of the diesel particulate filter device is equal to or lower than a continuous regeneration control start temperature.

5. An exhaust gas purification method for removing nitrogen oxides in an exhaust gas of an internal combustion engine by using an exhaust gas purification system in which an ammonia-based solution feeder, a previous-stage NOx selective reduction catalyst device, and a subsequent-stage NOx selective reduction catalyst device are disposed in an exhaust system of the internal combustion engine in this order from an exhaust port side, wherein the method comprises:

measuring an amount of NOx downstream of the previous-stage NOx selective reduction catalyst device;

measuring an amount of NOx downstream of the subsequent-stage NOx selective reduction catalyst device;

finding, from an equivalence ratio of a chemical equation, an amount which enables reduction of an amount of NOx discharged from the internal combustion engine;

calculating a first ammonia-based solution amount larger than the amount enabling the reduction;

calculating a second ammonia-based solution amount from a difference between a NOx target discharge amount from the internal combustion engine, and the amount of NOx measured downstream of the subsequent-stage NOx selective reduction catalyst device, when the amount of NOx measured downstream of the previous-stage NOx selective reduction catalyst device is larger than the NOx target discharge amount of the internal combustion engine;

setting an amount of an ammonia-based solution to be fed to the exhaust system based on the sum of the first ammonia-based solution amount and the second ammonia-based solution amount; and feeding the ammonia-based solution from the ammonia-based solution feeder into the exhaust system to reduce the amount of the NOx discharged from the internal combustion engine; and feeding a hydrocarbon into the exhaust gas upstream of the previous-stage oxidation catalyst device by post injection via injection inside a cylinder or by exhaust pipe fuel injection in a case where a differential pressure between upstream and downstream sides of the diesel particulate filter device is equal to or higher than a continuous regeneration determination differential pressure but equal to or lower than an automatic forced regeneration determination differential pressure, and a temperature of the exhaust gas at an inlet of the diesel particulate filter device is equal to or lower than a continuous regeneration control start temperature.

\* \* \* \* \*